United States Patent
Crawford

(10) Patent No.: US 7,216,846 B2
(45) Date of Patent: May 15, 2007

(54) APPARATUS AND METHODS FOR DISPOSING CONDUITS, WIRES, AND THE LIKE THROUGH STRUCTURES

(76) Inventor: James Ernest Crawford, 120 Quail Roost La., Hilham, TN (US) 38568

(*) Notice: Subject to any disclaimer, the term of this patent is extended or adjusted under 35 U.S.C. 154(b) by 19 days.

(21) Appl. No.: 10/912,019

(22) Filed: Aug. 5, 2004

(65) Prior Publication Data

US 2006/0027795 A1    Feb. 9, 2006

(51) Int. Cl.
B66F 3/00    (2006.01)
(52) U.S. Cl. .......................................... 254/134.3 FT
(58) Field of Classification Search ....... 254/134.3 FT, 254/134.4, 134.3 R
See application file for complete search history.

(56) References Cited

U.S. PATENT DOCUMENTS

| | | | |
|---|---|---|---|
| 2,158,232 A * | 5/1939 | Grau et al. ............... | 294/82.16 |
| 2,620,160 A * | 12/1952 | Ray ......................... | 254/93 R |
| D202,107 S * | 8/1965 | Moldt, Jr. ................ | D13/156 |
| 3,567,268 A * | 3/1971 | Peterson ................... | 294/86.4 |
| 3,952,999 A | 4/1976 | Keller et al. | |
| 4,191,409 A | 3/1980 | Ballantyne | |
| 4,413,808 A | 11/1983 | Finkle | |
| 4,432,663 A * | 2/1984 | Lasak et al. ............... | 403/275 |
| 4,635,989 A * | 1/1987 | Tremblay et al. ........ | 294/102.1 |
| 4,909,481 A | 3/1990 | Tamm | |
| 4,917,362 A | 4/1990 | Wilson | |
| 5,029,817 A | 7/1991 | Tamm | |
| 5,039,196 A * | 8/1991 | Nilsson ...................... | 385/136 |
| 5,096,163 A | 3/1992 | Swearingen | |
| 5,149,056 A | 9/1992 | Jones | |
| 5,178,427 A * | 1/1993 | Jorritsma ................ | 294/82.36 |
| 5,311,712 A | 5/1994 | Accousti | |
| 5,382,752 A | 1/1995 | Reyhan et al. | |
| 5,451,101 A | 9/1995 | Ellison et al. | |
| 5,501,549 A | 3/1996 | Breda et al. | |
| 5,654,526 A | 8/1997 | Sharp | |
| 6,193,217 B1 * | 2/2001 | Zimmer .............. | 254/134.3 FT |
| 6,450,558 B1 * | 9/2002 | Ringrose .................... | 294/82.2 |
| 6,789,384 B2 * | 9/2004 | Hungerford .................... | 59/93 |
| 6,883,782 B2 * | 4/2005 | Ames et al. ........ | 254/134.3 FT |

* cited by examiner

Primary Examiner—Lee D. Wilson
(74) Attorney, Agent, or Firm—Alston & Bird LLP

(57) ABSTRACT

A connection apparatus and associated method are provided. The connection apparatus is configured to be connected to a guide line and a conduit so that the conduit can be pulled through a structure by the guide line. In this regard, the apparatus can include a body member that extends between first and second ends and defines a connector for engaging the guide line and an engagement portion for engaging the conduit. In some cases, a second connector is provided to engage a cable, such as an electrical wire, that is disposed in the conduit. Thus, the apparatus can be used to pull the conduit by a leading end thereof, and the apparatus can additionally pull the cable through the structure with the conduit, i.e., without requiring separate operations. The body member can also define a tapered outer contour, such as a frustoconical shaped end, to facilitate the passage of the apparatus and conduit through the structure.

18 Claims, 4 Drawing Sheets

APPARATUS AND METHODS FOR DISPOSING CONDUITS, WIRES, AND THE LIKE THROUGH STRUCTURES

BACKGROUND OF THE INVENTION

1) Field of the Invention

The present invention relates to an apparatus and method for disposing conduits, wires, and the like through structures, for example, in connection with the placement of electrical wires through a wall to an outlet or switch.

2) Description of Related Art

The wires of an electrical system for a building structure are typically housed in tubular conduits. The tubular conduits can extend through walls, attics, basements, and crawlspaces, between floors and ceilings, and the like. In order to position the tubular conduits in an existing building, such as during a retrofitting of the electrical system of the building, the conduits are often inserted through the structure via a limited number of access points.

For example, in one typical installation, flexible metal conduit is inserted at the top of a wall to extend between the two parallel faces of the wall down to an electrical outlet or switch positioned on the wall. In order to install the conduit in this configuration, a long electrical snake or guide line is fished between the two access points. For example, a first end of the guide line can be inserted into a hole in the wall at the location of the outlet or switch and pushed in a direction toward the top of the wall until the first end emerges from the top of the wall. Importantly, the guide line is long enough to extend entirely through the wall with at least an equal length of the guide line disposed outside the wall. Thus, with the guide line positioned in the wall, the first end of the guide line can be inserted through a first end of the conduit, completely through the conduit, and out of a second end of the conduit. The first end of the guide line is hooked onto the conduit. The guide line is then pulled back through the wall by its second end so that the first end of the guide line, which now trails at the end of the guide line, pushes the conduit into position, i.e., between the two access points. The guide line, which is still disposed in the conduit, can be unhooked from the conduit and instead hooked to a wire or pull string so that the wire or pull string is pulled into the conduit as the guide line is removed therefrom. If a pull string is used, the pull string can then be connected to a wire and used to pull the wire into the conduit.

As the guide line and conduit are pulled through the wall, because the first end of the guide line is hooked to the back (i.e., the trailing end) of the conduit, it pushes the conduit and, in some cases, compresses and reduces the length of the conduit. For example, conduit formed of corrugated metal tubing can be compressed and shortened by 25% of more during installation. Thus, in some cases, the conduit must be provided with a length that is about ⅓ longer than the distance between the access points so that the conduit reaches between the access points after it is compressed during installation. This generally requires a greater amount of conduit for a given installation. In addition, the conventional installation requires separate operations for installing the conduit and the wiring. That is, as described above, the conduit is first positioned in the structure between the two access points, and then the guide line or a pull string is used to pull the wire into the conduit.

Thus, there exists a need for a device and method for installing tubular conduit, wire, and the like in a structure. The device should be capable of connecting a snake or guide line to the conduit so that the conduit can be pulled into position without significant compression of the conduit. Further, the device should be capable of connecting to the conduit and/or the wire without the guide device being disposed through the entire conduit.

BRIEF SUMMARY OF THE INVENTION

The present invention provides an apparatus for connecting a guide line and a conduit so that the conduit can be pulled through a structure by the guide line. According to one embodiment, the apparatus includes a body member that extends from a first end to a second end. A first connector at the first end is configured to engage the guide line, and the body member defines an engagement portion configured to engage the conduit so that the guide line and conduit are connected. For example, the engagement portion can define a circumferential thread on the outer surface of the body member so that the second end of the body member can be screwed into the conduit. Alternatively, the second end of the body can be hollow to receive the conduit, and/or the engagement portion can define other connectors such as ribs, bumps, spikes, other projections, one or more set screws, outwardly adjustable or expandable members, and the like. In any case, a second connector can be provided at the second end of the body member and configured to engage a cable, such as an electrical wire, that is disposed in the conduit. The body member can also define a frustoconical outer contour that tapers in a direction toward the first end of the body member. The frustoconical outer contour, which can have a maximum cross-sectional size that is greater than the cross-sectional size of the engagement portion, can facilitate the movement of the apparatus through the structure.

According to one method of the present invention for disposing a conduit through a structure, a guide line is disposed through the structure between first and second access ports. A first end of a connection apparatus is engaged to a first end of the guide line extending from the second access port, and a second end of the connection apparatus is engaged to a leading end of the conduit. For example, the first end of the guide line can be disposed through an aperture defined by the connection apparatus, and the second end of the connection apparatus can be screwed into the conduit. The guide line is pulled toward the first access port to thereby pull the leading end of the conduit via the connection apparatus through the structure so that the conduit extends between the first and second access ports.

In some cases, a cable can be disposed in the conduit before the installation of the conduit, and the cable can be connected to the connection apparatus before the connection apparatus and conduit are pulled through the structure. For example, the cable can be an electrical wire so that the electrical wire is positioned in the structure with the conduit. Alternatively, the cable can be used to pull an electrical wire into the conduit after the conduit is positioned in the structure.

BRIEF DESCRIPTION OF THE SEVERAL VIEWS OF THE DRAWINGS

Figure 1:
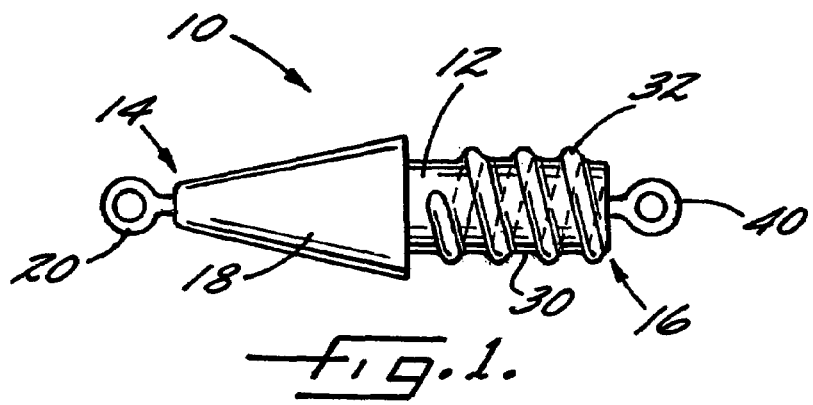
Figure 2:
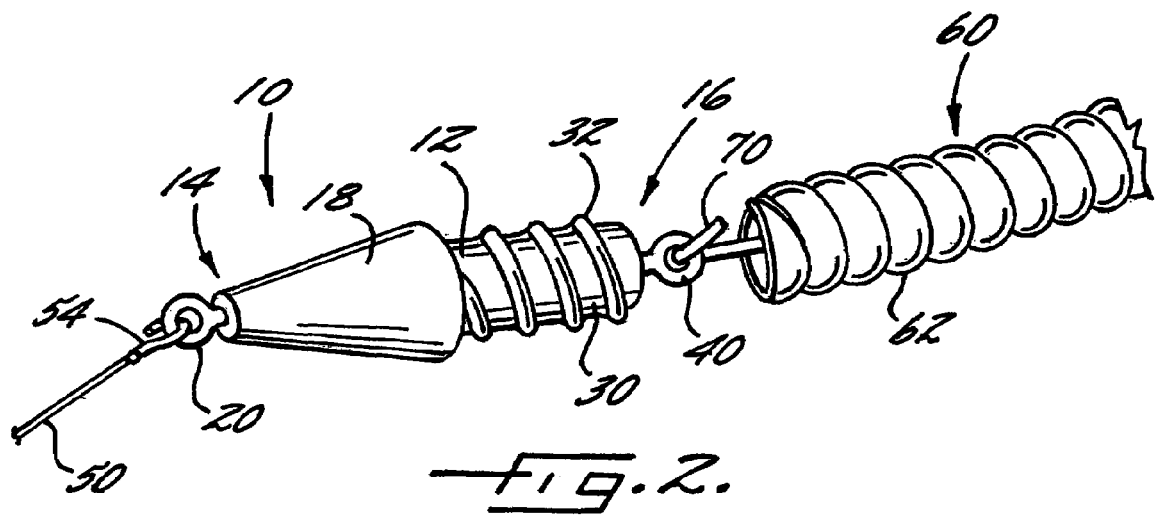
Figure 3:
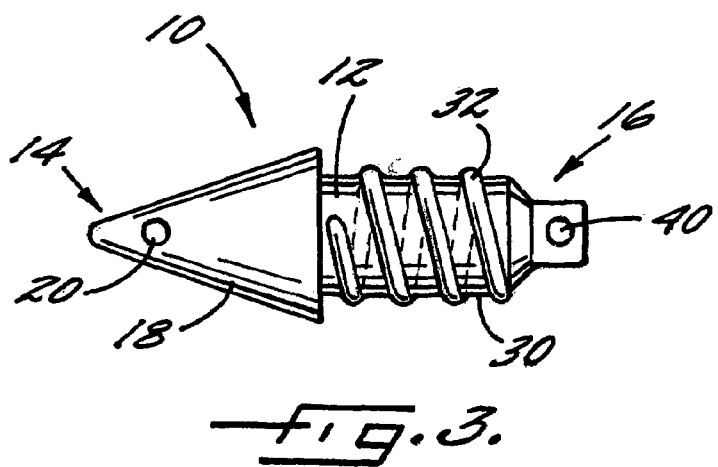
Figure 4:
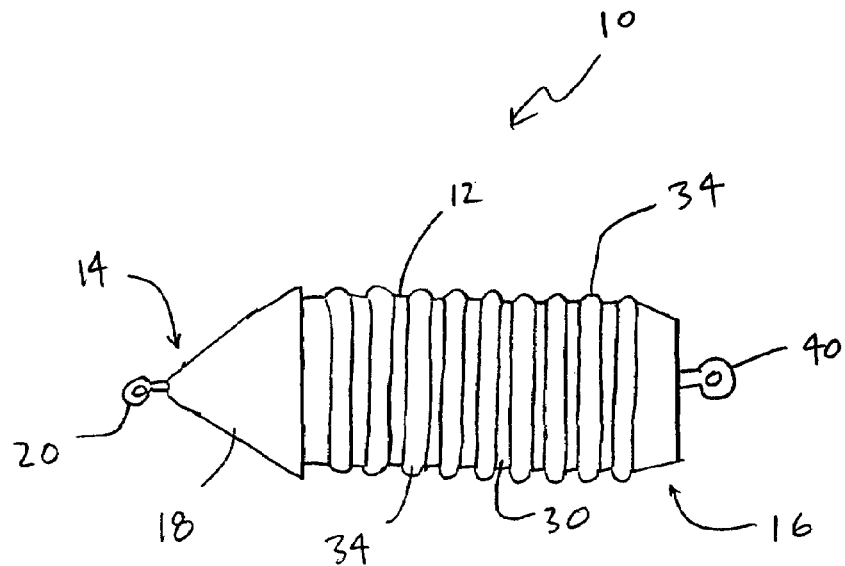
Figure 5:
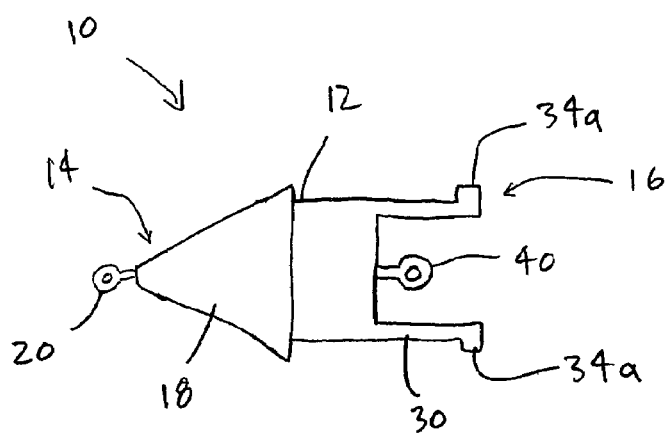
Figure 6:
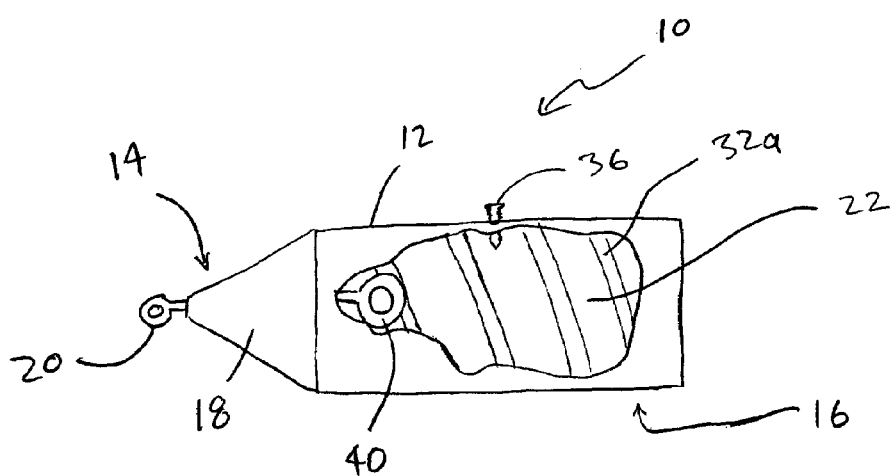
Figure 7:
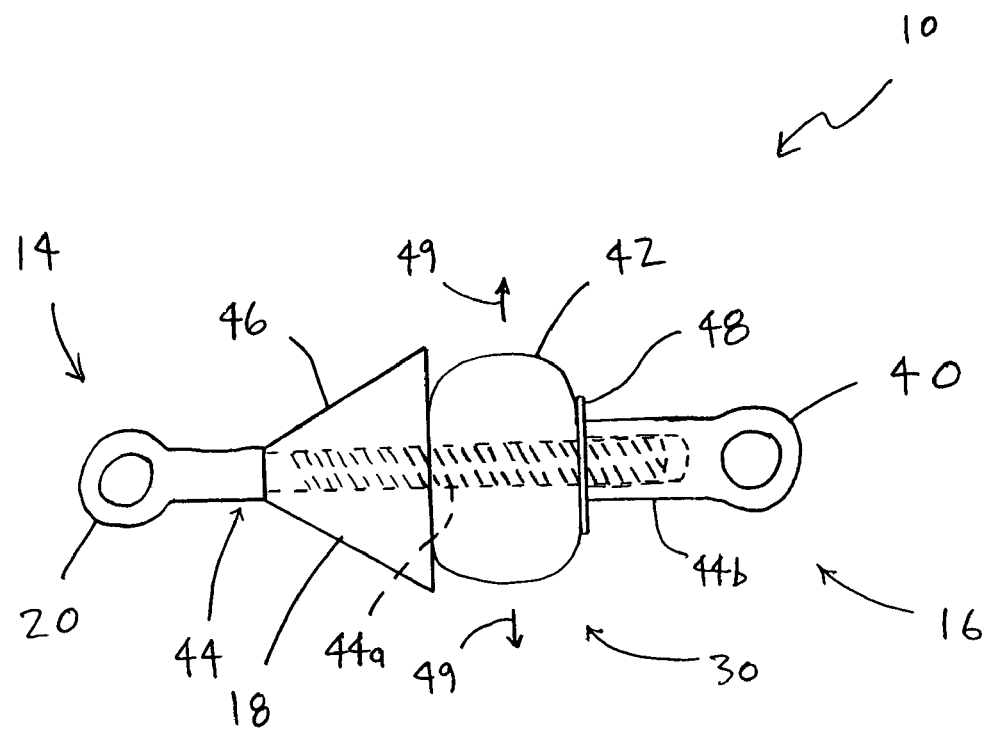
Figure 8:
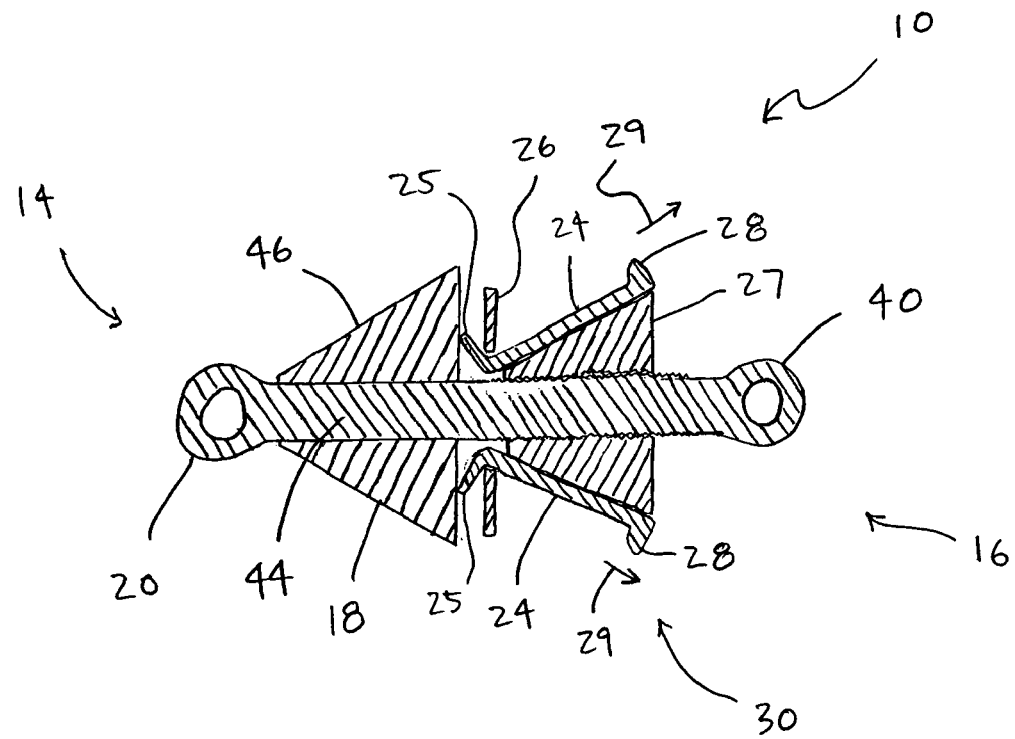
Figure 11:
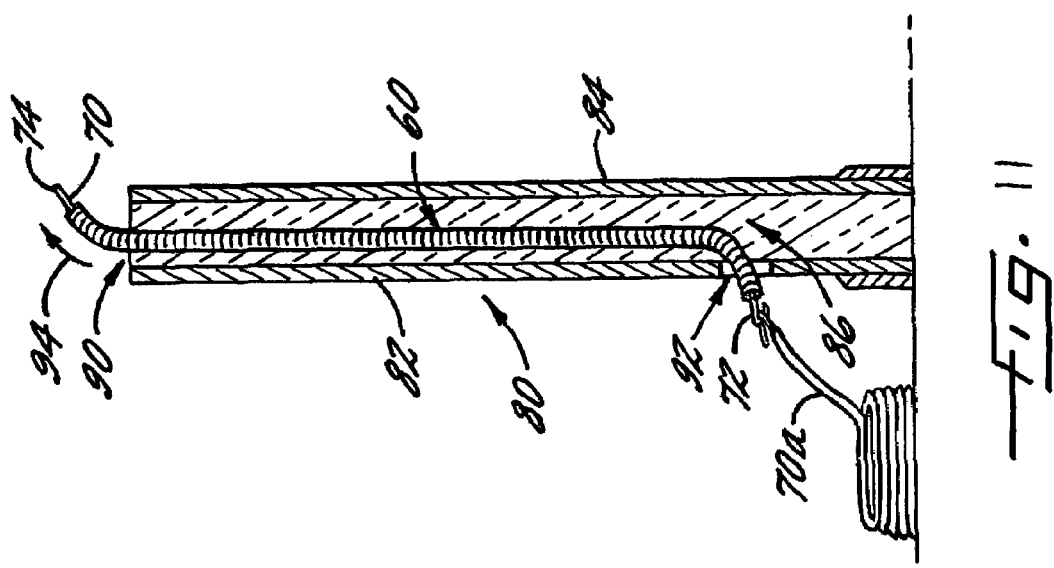
Figure 10:
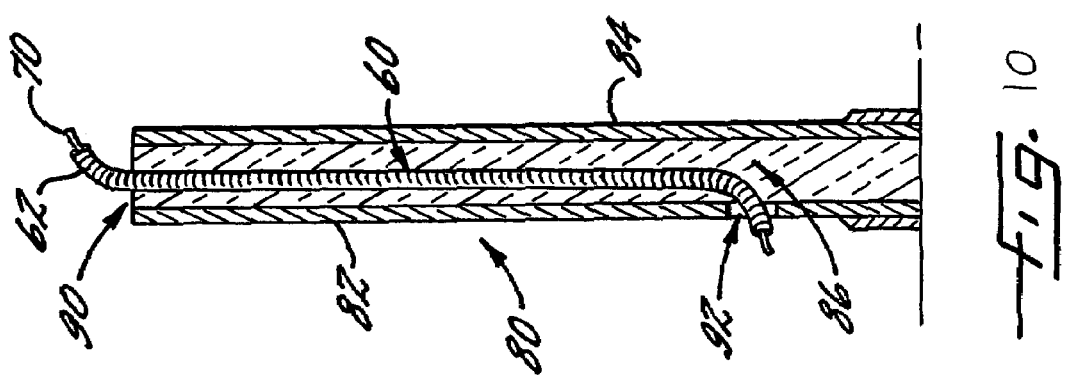
Figure 9:
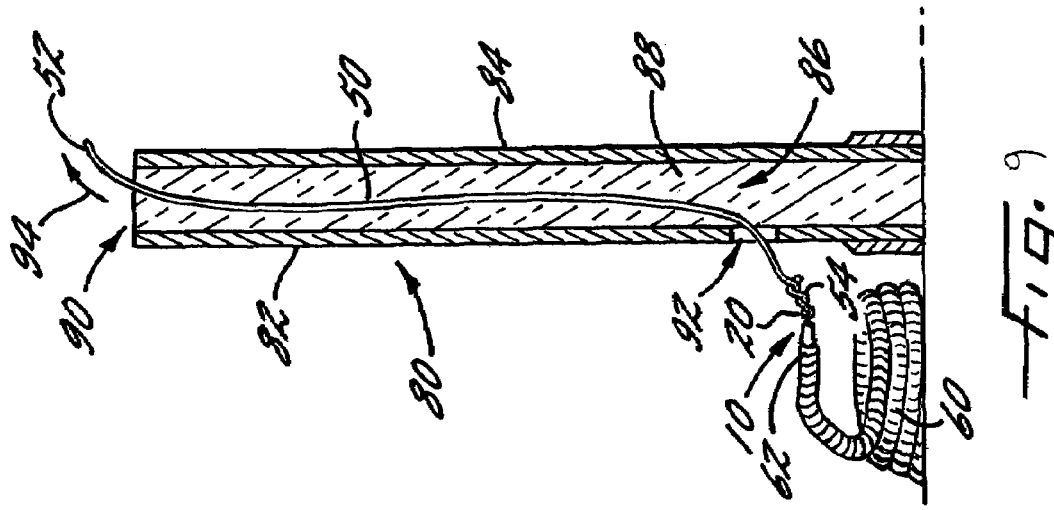

Having thus described the invention in general terms, reference will now be made to the accompanying drawings, which are not necessarily drawn to scale, and wherein:

FIG. 1 is side view illustrating a connection apparatus for connecting a guide line to a tubular conduit and a cable disposed in the tubular conduit according to one embodiment of the present invention;

FIG. 2 is a perspective view illustrating the connection apparatus of FIG. 1 connected to a cable in a tubular conduit;

FIG. 3 is a side view illustrating a connection apparatus according to another embodiment of the present invention;

FIG. 4 is a side view illustrating a connection apparatus according to another embodiment of the present invention;

FIG. 5 is a side view illustrating a connection apparatus according to another embodiment of the present invention;

FIG. 6 is a side view illustrating a connection apparatus with a hollow engagement portion for receiving the conduit according to yet another embodiment of the present invention;

FIG. 7 is a side view illustrating a connection apparatus with a deformable member according to still another embodiment of the present invention;

FIG. 8 is a section view illustrating a connection apparatus with adjustable engagement members according to another embodiment of the present invention;

FIGS. 9 and 10 are partial section views sequentially illustrating the operations for installing a conduit and wire into a wall using the connection apparatus of FIG. 1 according to one embodiment of the present invention; and FIG. 11 is a partial section view illustrating an optional operation for installing the wire into the conduit and wall of FIGS. 9 and 10 according to another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and in particular to FIGS. 1 and 2, there is shown a connection apparatus 10 according to one embodiment of the present invention. The connection apparatus 10 can be used to connect a guide line 50 to various members that are to be disposed in a structure, such as a conduit, electrical wire or other cables, and the like. For example, the connection apparatus 10 can be used in conjunction with the guide line 50 to pull tubular conduits 60, wires or cables 70, and the like into a structure to extend between different portions of the structure. Other types of conduit can similarly be used, such as a conduit with a square cross-sectional shape or otherwise. The conduit can be formed of metal, plastic, and the like, and can define a generally spiral shape, successive grooves and ridges, or other configurations.

As illustrated in FIG. 1, the connection apparatus 10 generally includes a body member 12 that defines first and second ends 14, 16. A first connector 20 is defined at the first end 14 of the body member 12 so that a guide line 50 or the like can be connected to the first end 14 of the apparatus 10. The second end 16 of the body member 12 is configured to engage the tubular conduit 60. That is, the second end 16 can define an engagement portion 30 for engaging the tubular conduit 60. In particular, the engagement portion 30 can define threads 32 that extend generally circumferentially around the body member 12, e.g., helically, so that the body member 12 can be connected to the tubular conduit 60 by screwing the engagement portion 30 into the tubular conduit 60. In addition, the second end 16 of the connection apparatus 10 can define a second connector 40 for engaging the cable 70 disposed in the conduit 60.

Each of the first and second connectors 20, 40 can be a hook, aperture, or other connector for connecting the apparatus 10 to a guide line 50 and a cable 70. For example, as shown in FIG. 2, each connector 20, 40 can be any of various types of hooks such as a closed hook, open hook, eye hook, and the like. The connectors 20, 40 can also be adjustable to clamp or otherwise engage a guide line 50 and cable 70. In any case, the connectors 20, 40 can extend from the rest of the body member 12 as shown in FIGS. 1 and 2. Alternatively, as shown in FIG. 3, each connector 20, 40 can be an aperture that is formed integrally with the rest of the body member 12.

In the embodiments illustrated in FIGS. 1-3, the engagement portion 30 includes threads 32 for engaging the inner surface of the conduit 60. It must be understood that other structures may be used to form a frictional engagement between the engagement portion 30 and the inner surface of the conduit 60. For example, the engagement portion 30 could include gripping members, such as teeth, ribs, grooves, bumps, knurls, spikes, other projections, or any other structure or contour. In one embodiment illustrated in FIG. 4, the engagement portion 30 defines a plurality of successive ribs 34. The ribs 34 are rounded, but in other cases, the ribs 34 can be pointed, square, or otherwise shaped. In another embodiment, illustrated in FIG. 5, the engagement portion 30 includes a cantilevered ribs 34a that can be screwed into the conduit 60 or compressed radially inward and inserted into the conduit so that the ribs 34a then spring radially outward to grip the inside surface of the conduit 60. In addition, while the engagement portion 30 is illustrated in FIGS. 1-3 as being cylindrical to match the circular cross-sectional shape of the conduit 60, it is understood that the conduit 60 may have any shape, and the engagement portion 30 can be shaped to accommodate and/or correspond to the shape of the conduit 60.

Further, FIGS. 1-3 only illustrate examples of the structure of the apparatus 10, and a variety of other structures are possible. In particular, while the embodiments of FIGS. 1-3 include a threaded engagement portion 30 that is configured to be inserted into the conduit 60, the engagement portion 30 can instead define a hollow member with internal gripping members, such as threads, teeth, ribs, grooves, bumps, knurls, spikes, or other projections, or any other structure for engaging the external surface of the conduit 60. For example, in one embodiment illustrated in FIG. 6, the engagement portion 30 is hollow and the end of the conduit 60 would be inserted or threaded into the engagement portion 30, as opposed to the engagement portion 30 being inserted into the conduit 60 as illustrated in FIGS. 1 and 3. Threads 32a or other engagement features can extend radially inward from an inner surface 22 of the engagement portion 30, and the connector 40 can be located within the hollow engagement portion 30. In some embodiments, a set screw 36 can also be provided for engaging the conduit 60. In fact, in some cases, one or more set screws 36 can be tightened to engage the conduit 60 in the engagement portion 30, and the set screw(s) 36 can provide engagement with the conduit 60 with or without other engagement features. That is, the apparatus 10 can be formed without the threads 32a so that the inner surface 22 of the engagement portion 30 is a smooth cylindrical bore for receiving the conduit 60.

In other embodiments of the present invention, the apparatus 10 can include adjustable members for engaging the inner surface of the conduit 60, such that the apparatus 10 can be at least partially inserted into the conduit 60 and then adjusted, i.e., by expanding, moving, or otherwise reconfiguring, so that the apparatus 10 in engaged to the conduit 60. For example, as illustrated in FIG. 7, the engagement portion 30 of the apparatus 10 includes a deformable member 42, such as a grommet formed of rubber or other resilient materials such as polymers and the like. The deformable member 42 defines an aperture, through which a threaded shaft 44 extends. The shaft 44 defines or otherwise connects the first and second connectors 20, 40. For example, the shaft 44 can included first and second portions 44a, 44b that define the first and second connectors 20, 40, respectively, and the portions 44a, 44b can be connected by corresponding threads. The deformable member 42 is disposed on the shaft 44 between a cone 46 defining the frustoconical outer contour 18 and a washer 48. Thus, as the first portion 44a is rotated relative to the second portion 44b, the deformable member 42 is compressed between the cone 46 and the washer 48 and thereby deformed radially outward in directions 49. In operation, the cable 70 in the conduit 60 can be connected to the second connector 40, and the first portion 44a can be partially unthreaded from the second portion 44b so that the deformable member 42 can be inserted into the conduit 60. With the deformable portion 42 in the conduit 60, and the cone 46 typically disposed outside the conduit 60, the first portion 44a of the shaft 44 is rotated and thereby tightened into the second portion 44b. The deformable member 42 is adjusted, i.e., deformed radially outward and pressed into engaging contact with the conduit 60. After use, the apparatus 10 can be removed from the conduit 60 by partially unscrewing the first portion 44a from the second portion 44b so that the deformable member 42 is at least partially uncompressed and can be removed from the conduit.

In other embodiments of the present invention, the engagement portion 30 can include a variety of other adjustable devices to engage the apparatus 10 to the conduit 60. For example, as illustrated in FIG. 8, the engagement portion 30 can include a plurality of flanges 24 or other adjustable gripping devices arranged circumferentially around a unitary or multi-piece shaft 44 that extends between the connectors 20, 40. A first tab 25 of each flange 24 is retained between the shaft 44 and an annular washer 26. Further, a threaded wedge 27, which can be conical in shape, can be disposed on a threaded portion of the shaft 44 so that the wedge 27 can be screwed against the flanges 24 to adjust the flanges 24 radially outward. With the flanges 24 configured as shown in FIG. 8, the cable 70 in the conduit 60 can be connected to the second connector 40, and the second connector 40 and flanges 24 can be inserted into the conduit 60 so that teeth 28 on the flanges 24 engage the inside of the conduit 60, typically with the cone 46 disposed outside the conduit 60. Further, as the apparatus 10 is pulled through a wall or other structure, the flanges 24 tend to adjust radially outward to grip the conduit 60. That is, as the shaft 44 and wedge 27 are pulled through the structure, the wedge 27 is pushed against the flanges 24, urging the flanges 24 in directions 29 and, hence, radially outward against the conduit 60.

It is appreciated that the connection apparatus 10 can define various configurations and can be formed of a variety of materials. In some cases, the body member 12 can be formed as an integral or unitary member. For example, the body member 12 can be molded, machined, or otherwise formed of a single piece of plastic, metal, wood, composite materials, and the like. Alternatively, the apparatus 10 can be an assembly of several separate components. For example, the connectors 20, 40 can be formed separately from the rest of the body member 12 and attached thereto by screwing each connector 20, 40 into the respective end 14, 16. Further, in some cases, the apparatus 10 can be formed of more than one material. For example, each connector 20, 40 can be formed of a relatively strong material, such as steel, aluminum, or other types of metal, and rest of the apparatus 10 can be formed of molded plastic or the like. In any case, the body member 12 can be a solid or hollow member.

The connection apparatus 10 can be used to dispose conduit 60, wires, and the like through any type of structure. In particular, the apparatus 10 can be used to place the tubular conduit 60 through the structure of a building, such as through spaces in a wall, attic, basement, crawlspace, floor, ceiling, and the like. Thus, the apparatus 10 can be used to position the conduit 60 after the structure is constructed, e.g., to retrofit an existing building with new conduit and/or electrical wire. Further, the apparatus 10 can be used to position the conduit 60 through a space that is otherwise occupied by insulation, other wiring, pipes, and the like. In this regard, the body member 12 can define a tapered outer contour configured to facilitate the passage of the connection apparatus 10 and the conduit 60 without being impeded by the structure through which the apparatus 10 is passing or by insulation and other materials disposed in the structure. For example, as illustrated in FIGS. 1-3, the connection apparatus 10 can define a frustoconical outer contour 18 that tapers in a direction toward the first end 14 of the body member 12. By the term "frustoconical," it is meant that the body portion 12 defines a conical shape or a partially conical shape. The maximum cross-sectional size of the frustoconical contour 18 can be slightly greater than the cross-sectional size of the engagement portion 30 of the body member 12 and/or the diameter of the tubular conduit 60 so that the apparatus 10 can be easily pulled through the structure without becoming caught therein. In other embodiments, the body portion 12 can define other tapered shapes, rounded shapes, or other contours configured to resist being caught within the structure while being passed therethrough.

FIGS. 9-11 illustrate the operations for installing the conduit 60 and cable 70 into a wall 80 according to one embodiment of the present invention. It is appreciated that the connection apparatus 10 can be used to install other types of materials and/or in other types of structures. Further, the installation that is illustrated in FIGS. 9-11 is exemplary in nature, and it is appreciated that the connection apparatus 10 can be used in other manners.

As illustrated in FIG. 9, the structure can include the wall 80 defined by first and second parallel wall layers 82, 84, which can be formed of plasterboard, plaster, wood, brick, or other materials suitable for interior or exterior wall construction. Between the two layers 82, 84 is a space 86, in which studs or other support structure can be disposed. Further, insulation 88 can be disposed in the space 86 to improve the thermal or acoustic insulation of the wall 80. The space 86 extends between access ports at different positions on the wall 80. For example, as illustrated in FIG. 9, a first access port 90 is provided at the top of the wall 80 between the two layers 82, 84, and a second access port 92 extends through the first layer 82 at a position where it is desired to mount an electrical outlet, electrical switch, television cable connector, network connector, or the like.

The guide line 50 can be inserted through one of the access ports 90, 92 and pushed through the space 86 in the wall 80 to the other access port 90, 92 so that the line 50 extends between the two ports 90, 92. The guide line 50 can be a flat strap-like member, a wire or other cable, or the like. In some cases, the guide line 50 is sufficiently stiff so that a user can insert a first end 52 of the guide line 50 through the second port 92 and push the first end 52 upwards through the wall 80 to the first access port 90 at the top of the wall 80 as shown in FIG. 9. Otherwise, the guide line 50 can be pushed downward from the first access port 90 toward the second access port 92. In any case, before or after the guide line 50 is disposed in the wall 80, the connection apparatus 10 is connected to the conduit 60 and to the guide line 50. That is, the first connector 20 can be engaged to the guide line 50, e.g., by hooking, twisting, tying, or otherwise connecting a second end 54 of the guide line 50 that extends from the second access port 92 to the first connector 20 of the connection apparatus 10 as shown in FIGS. 2 and 9. Further, as described above in connection with FIGS. 1-3, the connection apparatus 10 can be connected to the conduit 60 by screwing the second end 16 into the conduit 60 so that the engagement portion 18 is secured to the inner surface of the tubular conduit 60. In addition, if a cable 70 is already disposed in the conduit 60 at the time of installation of the conduit 60 into the wall 80, the cable 70 can be connected to the second connector 40 before the connection apparatus 10 is screwed into the conduit 60, e.g., by hooking, twisting, tying, or otherwise connecting the cable 70 to the connector 40 as shown in FIG. 2.

With the conduit 60 connected to the second end 54 of the guide line 50, the first end 52 of the guide line 50 can be pulled from the first access port 90 so that the second end 54 of the guide line 50 and, hence, the connection apparatus 10 and a first end 62 of the conduit 60 are pulled in direction 94 through the wall 80, toward and through the first access port 90. Thereafter, with the conduit 60 disposed between the first and second access ports 90, 92 as shown in FIG. 10, the guide line 50 and the connection apparatus 10 can be disconnected from the conduit 60.

In some cases, the cable 70 in the conduit 60 can be an electrical wire which is to be housed in the conduit 60. Thus, the wire can be pulled into position at the same time as the conduit 60, i.e., so that separate operations are not required for positioning the conduit 60 and the wire. In fact, the wire can be disposed in the conduit 60 automatically in connection with the manufacture of the conduit 60 or otherwise prior to installation in the wall 80, thereby further simplifying the installation process.

Alternatively, the cable 70 in the conduit 60 during the initial installation of the conduit 60 can be a pull line, i.e., an elongate member that is provided in the conduit 60 for pulling wire therethrough after the conduit 60 is installed. For example, as shown in FIG. 11, one end 72 of the cable 70 can be connected to an electrical wire 70*a*, and the opposite end 74 can be pulled from the conduit 60 in direction 94 so that the wire 70*a* is pulled into the conduit 60 to extend between the first and second access ports 90, 92 with the conduit 60.

It is appreciated that the connection apparatus 10 of the present invention can be used to pull the conduit 60 through a structure by a leading end of the conduit 60. For example, as illustrated in FIGS. 9 and 10, the connection apparatus 10 is connected to the first end 62 of the tubular conduit 60, and the same end 62 of the conduit 60 is the leading end as the conduit 60 passes through the wall 80. In this regard, the conduit 60 is generally pulled through the wall 80, and is not subjected to significant compression that would compress, i.e., shorten, the conduit 60. Thus, the length of the conduit 60 provided for installation can be about the same as the distance between the first and second access ports 90, 92, thereby minimizing the amount of conduit 60 required for the installation. Further, in some cases, a shorter length of wire can also be used in the conduit 60 for extending between the access ports 90, 92 relative to the length that would otherwise be required if the conduit 60 were disposed in the conventional manner.

In addition, the installation of the conduit 60 according to some embodiments of the present invention can require fewer operations than conventional methods of installation. In particular, as described above in connection with FIGS. 9-11, the guide line 50 can be used to pull the leading end 62 of the conduit 60 and therefore the guide line 50 need not be inserted entirely through the conduit 60. In fact, the guide line 50 generally need not be significantly longer than the distance between the first and second access ports 82, 84. Moreover, if the cable 70 is an electrical wire that is disposed in the conduit 60 before the cable 70 is installed as shown in FIG. 10, the wire need not be installed after the conduit 60 is in place in the wall 80. In some cases, it may be easier to dispose the wire in the conduit 60 before installation of the conduit 60 in the wall 80, e.g., using automated feeding equipment, so that the automated feeding equipment is not required at the site of installation of the conduit 60. The particular type of cable 70 can be selected according to the application and intended use. For example, the cable 70 can be a multi-conductor electrical wire suitable for providing power to an outlet or switch, communicating television or telephone signals, carrying computer or other network communications, and the like. In some cases, the cable 70 can include fiber optic strands or other communication media.

It is also appreciated that the connection apparatus 10 can be provided in one or more sizes that correspond to the size(s) of tubular conduit 60. For example, the connection apparatus 10 can be provided in different sizes, each size having an engagement portion that has a diameter that is approximately equal to the inner diameter of common flexible tubular metal conduit 60. In particular, flexible metal conduit is typically available in nominal sizes such as about ¾ inch, ½ inch, and ⅜ inch, and the connection apparatus 10 can be sized correspondingly.

As illustrated in FIG. 2, the apparatus 10 is installed into the end of the conduit 60 and also connects to the cable 70. In addition to being used to pull the conduit 60 and cable 70 through a structure, the apparatus 10 could also be used to maintain the position of the cable 70 in the conduit 60 and/or maintain the position of the conduit 60 and cable 70 in the structure. Specifically, it may be important to ensure that the wire remains within the conduit 60 after the conduit 60 is installed in the structure. For example, if the conduit 60 is to be installed in the structure but not to be immediately wired to an outlet or switch, the apparatus 10 could be maintained on the end of the conduit 60 to hold the wire inside the conduit 60, and or to anchor the conduit 60 in position in the structure.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for connecting a guide line, a conduit, and a cable disposed in the conduit such that the conduit and cable can be pulled through a structure by the guide line, the apparatus comprising:
   a body member extending from a first end to a second end, the body member defining an outer contour tapering in a direction toward the first end of the body member;
   a first hook extending from the first end of the body member, the first hook being configured to engage the guide line; and
   a second hook extending from the second end of the body member, the second hook being configured to engage the cable in the conduit,
   wherein the second end of the body member defines an engagement portion configured to engage the conduit such that the conduit and cable are connected to the guide line.

2. An apparatus according to claim 1 wherein the first hook extends from the first end of the body member in a first direction parallel to a longitudinal axis of the body member, and the second hook extends from the second end of the body member in an second direction parallel to the longitudinal axis of the body member and opposite from the first direction, the first hook defining an aperture for receiving the guide line in a transverse direction perpendicular to the longitudinal axis of the body member, and the second hook defining an aperture for receiving the cable in the conduit in a transverse direction perpendicular to the longitudinal axis of the body member.

3. An apparatus according to claim 1 wherein the engagement portion comprises at least one thread extending generally helically around the body member such that the second end of the body member is configured to be screwed into the conduit.

4. An apparatus according to claim 1 wherein the engagement portion defines a hollow portion with internal threads, the hollow portion being configured to receive a portion of the conduit screwed into the second end of the body member and engaged thereto.

5. An apparatus according to claim 1 wherein the outer contour is frustoconical and defines a maximum cross-sectional size that is greater than the cross-sectional size of the engagement portion of the body member.

6. An apparatus according to claim 1 further comprising at least one set screw disposed in the body member and configured to be advanced against the conduit and thereby engage the conduit to the apparatus.

7. An apparatus according to claim 1 wherein the engagement portion comprises at least one adjustable member configured to be adjusted radially outward to engage the conduit.

8. An apparatus according to claim 7 wherein the adjustable member is a deformable member disposed on a shaft extending in an axial direction of the body member, the deformable member configured to be compressed in the axial direction and thereby expanded radially outward to engage the conduit.

9. An apparatus for engaging a guide line, a flexible conduit, and a cable disposed in the conduit such that each of the conduit and cable can be pulled through a structure by the guide line to a configuration in which the cable and the conduit extend between first and second access ports in the structure, the apparatus comprising:
   an elongate body member extending from a first end to a second end, the body member defining an outer contour tapering in a direction toward the first end of the body member;
   a first hook at the first end of the body member extending from the first end of the body member and configured to engage the guide line; and
   a second hook at the second end of the body member extending from the second end of the body member and configured to directly engage the cable in the conduit such that the apparatus is configured to pull the cable through the structure with the conduit to a configuration in which the cable and the conduit each extend between the first and second access ports in the structure,
   wherein the second end of the body member defines an engagement portion configured to engage the conduit, the engagement portion defining a thread extending generally circumferentially around the second end of the body member such that the second end of the body member is configured to be screwed into the conduit such that the conduit and cable are connected to the guide line.

10. An apparatus according to claim 9 wherein the first hook defines an aperture for receiving and engaging the guide line.

11. An apparatus according to claim 9 wherein the tread corresponds to a shape of the inner surface extending along the length of the conduit such that the second end of the body member is configured to be screwed into a first end of the flexible conduit.

12. An apparatus according to claim 9 wherein the outer contour is frustoconical and defines a maximum cross-sectional size that is greater than the cross-sectional size of the engagement portion of the body member.

13. An apparatus according to claim 9 wherein the engagement portion comprises at least one adjustable member configured to be adjusted radially outward to engage the conduit.

14. An apparatus according to claim 13 wherein the adjustable member is deformable and configured to be compressed and thereby expanded radially outward to engage the conduit.

15. An apparatus for connecting a guide line, a conduit, and a cable disposed in the conduit such that the conduit and cable can be pulled through a structure by the guide line, the apparatus comprising:
   a body member extending along a longitudinal axis from a first end to a second end;
   a first hook at the first end of the body member extending in a first direction parallel to the longitudinal axis, the first hook defining an aperture for receiving the guide line in a transverse direction perpendicular to the longitudinal axis and thereby engaging the guide line with the body member;
   a second hook at the second end of the body member extending in a second direction parallel to the longitudinal axis and opposite from the first hook, the second hook defining an aperture for receiving the cable in a transverse direction perpendicular to the longitudinal axis and thereby engaging the cable in the conduit with the body member;
   at least one thread extending helically around the second end of the body member such that the second end of the body member is configured to be screwed to the conduit, the thread and the hooks thereby connecting each of the conduit and the cable to the guide line; and at least one set screw disposed in the body member and configured to be advanced against the conduit and thereby engage the conduit to the apparatus.

16. An apparatus according to claim 15 wherein the second end of the body member defines a hollow portion configured to receive a portion of the conduit into the second end of the body member.

17. An apparatus according to claim 15 wherein the body member defines an outer contour tapering in a direction toward the first end of the body member.

18. An apparatus according to claim 17 wherein the outer contour is frustoconical and defines a maximum cross-sectional size that is greater than the cross-sectional size of the engagement portion of the body member.

* * * * *